(No Model.)
G. J. KAPLAN.
DRAFT EQUALIZER.
No. 320,793. Patented June 23, 1885.
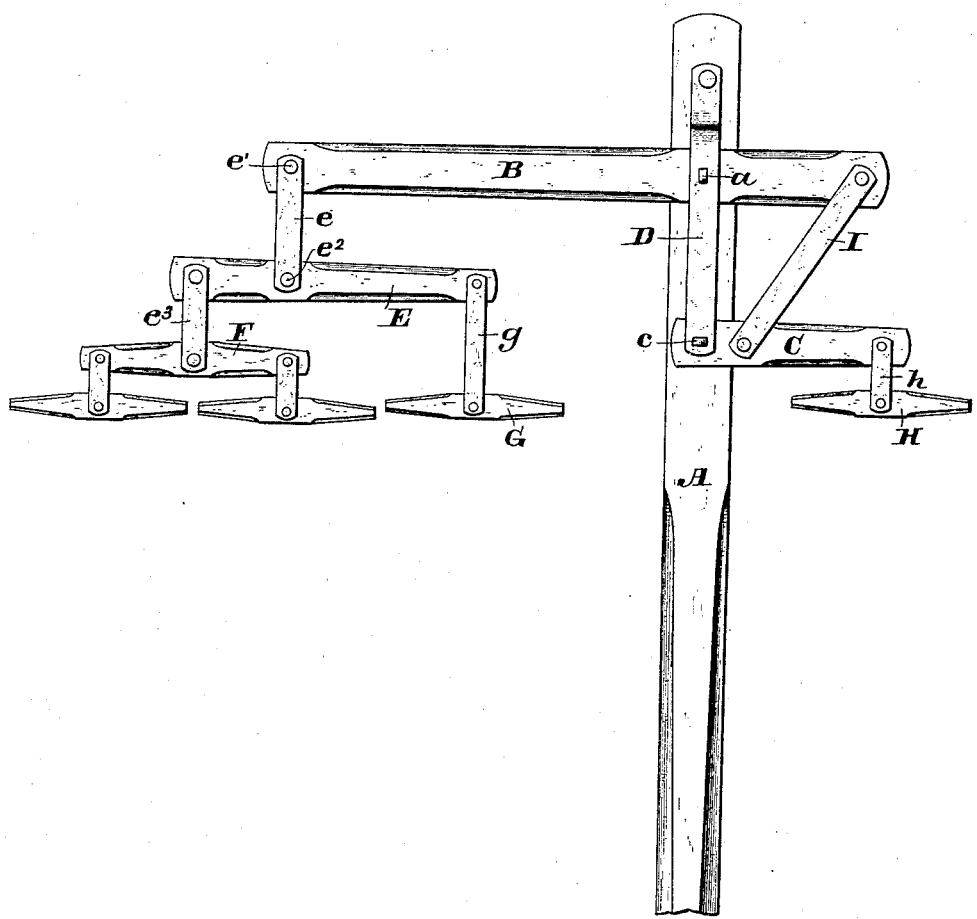
ATTEST-
J. Henry Kaiser.
Harry L. Amer.
INVENTOR-
Godfrey J. Kaplan
by L. Deane
his Attorney

UNITED STATES PATENT OFFICE.

GODFREY J. KAPLAN, OF OWATONNA, MINNESOTA.

DRAFT-EQUALIZER.

SPECIFICATION forming part of Letters Patent No. 320,793, dated June 23, 1885.

Application filed May 6, 1885. (No model.)

*To all whom it may concern:*

Be it known that I, GODFREY J. KAPLAN, a citizen of the United States, residing at Owatonna, in the county of Steele and State of Minnesota, have invented certain new and useful Improvements in Draft-Equalizers, of which the following is a specification, reference being had therein to the accompanying drawing, in which is shown a plan view of my improved compound draft-equalizer.

This invention relates to draft-equalizers which are especially designed for heavy plows; and it consists in the combination of double and single trees, with a compound leverage arranged and applied to the draft-pole, as will be fully understood from the following description when taken in connection with the annexed drawing.

A designates a draft-pole, to which is pivoted at $a$ a lever, B. In front of this lever and in line with the fulcrum $a$ thereof is another lever, C, which has it fulcrum at $c$. Both fulcra $a$ and $c$ are strongly sustained by a clip-brace, D, rigidly secured at its rear end to the draft-pole.

To the longest arm of the levers B a third lever, E, is connected by a double clip, $e$, the pivotal points being indicated by $e'$ $e^2$. To the shortest arm of this lever E is connected by a clip, $e^3$, a double-tree, F, to the center of which two single-trees are flexibly connected. To the longest arm of said lever E a single-tree, G, is flexibly connected by a clip, $g$.

The lever C has attached to it a single-tree, H, by means of a clip, $h$, and to this lever, near its fulcrum, a diagonal clip, I, is pivoted, which unites the lever to the short arm of the major lever B.

It will thus be observed that I combine with the draft-pole A a system of levers so disposed that one animal on the one left-hand side of the pole is not embarrassed by the pull of three animals on the right-hand side of the pole, all animals pulling alike.

The distinguishing feature of my invention is the combination of the diagonal clip I, which shortens the leverage between the major and minor levers, and thus affords an improved compound system of levers by means of which the draft of four animals can be utilized to a great advantage, all pulling evenly.

Having described my invention, I claim—

In a draft-equalizer, the combination of the following elements, viz: pole A, the short and long levers C B pivoted thereto, the single-tree H, flexibly connected to lever C, the diagonal clip I, pivoted to both of said levers to communicate motion between them, the lever E, flexibly attached to the longer end of B, the double and single trees F and G, flexibly attached to E, the clip-brace D, and pivots $a$ and $c$, substantially as and for the purposes described.

In testimony whereof I affix my signature in presence of two witnesses.

GODFREY J. KAPLAN.

Witnesses:
 JOHN E. BUXTON,
 E. W. RICHTER.